United States Patent [19]
Enderlein et al.

[11] Patent Number: 5,872,806
[45] Date of Patent: Feb. 16, 1999

[54] SPREAD SPECTRUM SIGNAL TRANSMISSION METHOD AND SYSTEM AND ALSO TRANSMITTER AND RECEIVER FOR USE WITH THE METHOD AND SYSTEM

[76] Inventors: Janos Enderlein, Krauenicketrasse 16, 10115 Berlin; Eduard Chilla, Am Pennigsberg 53, Königs-Wusterhausen; Heinz Jürgen Fröhlich, Neltestrasse 33, 12489 Berlin; Andreas Mönch, Bayreuther Strasse 6, 01187 Dresden, all of Germany

[21] Appl. No.: 695,056

[22] Filed: Aug. 9, 1996

[30] Foreign Application Priority Data

Oct. 8, 1995 [DE] Germany ......................... 195 29 477.7

[51] Int. Cl.⁶ .............................. H04B 15/00; H04B 1/38
[52] U.S. Cl. ........................... 375/200; 375/219; 375/204
[58] Field of Search ..................................... 375/200, 204, 375/208, 201, 202, 209, 219, 220, 242; 364/819, 821; 370/342

[56] References Cited

U.S. PATENT DOCUMENTS

| | | | |
|---|---|---|---|
| 4,926,440 | 5/1990 | Mikoshiba . | |
| 4,941,150 | 7/1990 | Iwasaki .................................... | 375/200 |
| 4,964,138 | 10/1990 | Nease et al. ............................. | 375/200 |
| 5,038,362 | 8/1991 | Takeuchi et al. ........................ | 375/200 |
| 5,583,884 | 12/1996 | Maruyama et al. ..................... | 375/200 |

FOREIGN PATENT DOCUMENTS 0 261 393   3/1988   European Pat. Off. .

OTHER PUBLICATIONS

Unkauf, M.G., "Surface Wave Devices in Spread Spectrum Systems", in: *Surface Wave Filters*, H. Matthews (Editor), John Wiley & Sons, N.Y., 1977, pp. 477–509.

Campbell, C., *Surface, Acoustic Wave Devices and Their Signal Processing Applications*, Academic Press, Inc., Boston, 1989, pp. 297–311.

Lattanza, J., et al., "240 MHZ Wideband Programmable SAW Matched Filter", in: *Ultrasonic Symposium* 1983, pp. 143–150.

Panasik, Carl M., et al., "A 16 Tap Hyrid Programmable Transversal Filter Using Monolithic GaAs Dual–GateFet Array", in: *Ultrasonics Symposium*, 1985, pp. 130–133.

Hickernell, F.S., et al., "SAW Programmable Matched Filter Signal Processor", in: *Ultrasonics Symposium*, 1980, pp. 104–108.

Merritt, S.W., et al., "GaAs SAW/MESFET Programmable Asynchronous Correlator with complex Tap Weighting", in: *Ultransonics Symposium*, 1983, pp. 181–184.

(List continued on next page.)

*Primary Examiner*—Chi H. Pham
*Assistant Examiner*—Khai Tran
*Attorney, Agent, or Firm*—Townsend and Townsend and Crew LLP

[57] ABSTRACT

A spread spectrum signal transmission method and spread spectrum signal transmission system in which a carrier frequency is frequency modulated with an analog or digital baseband signal in a transmitter, the frequency modulated carrier is converted into a pulse sequence, each pulse is converted into a band-spread signal linked with a code and transmitted via an antenna, and wherein the transmitted signal is subsequently received by an antenna and linked with a code which is the time inverse of the first named code, whereby a sequence of correlation peaks arises, which are converted into a pulse sequence and subsequently frequency demodulated to obtain an output signal corresponding to the analog or digital baseband signal. The method or the system make it possible to achieve an interference-free transmission of both analog and also digital signals with low transmitter power and/or large range, with a low number of system components, i.e. with simple and cost favorable system components.

19 Claims, 4 Drawing Sheets

OTHER PUBLICATIONS

Webster, R.T., et al., *Rayleigh Waves on GaAs, Rayleigh–Wave Theory and Application*, Springer Verlag, Berlin, 1984, Ch. 3, pp. 123–130.

Dixon, R.C. *Spread Spectrum Systems*, N.Y. Wiley, 1994. pp. 18–51.

Tsubouchi, K., et al., "An asynchronous Spread Spectrum Wireless–Modem Using a SAW Convolver", in: *Ultrasonics Symposium*, 1988, pp. 213–218.

Tsubouchi, K., et al., "An Asynchronous Multi–Channel Spread Spectrum Transceiver Using A SAW Convolver", in: *Ultrasonics Symposium*, 1989, pp. 165–170.

Tsubouchi, K., et al., "Full Duplex Transmission Operation of a 2.45–GHz Asynchronous Spread Spectrum Modem Using a SAW Convolver", *IEEE Transaction on Ultrasonics, Ferroelectrics, and Frequency Control*, 1993, vol. 40, No. 5, pp. 478–482.

Kavehrad, M., et al., "Design and Experimental Results for a Direct–Sequence Spread–Spectrum Radio Using Differential Phase–Shift Keying Modulation for Indoor, Wireless Communications", in: *IEEE Journal on Selected Areas i Communications*, 1987, vol. SAC–5, No. 5, pp. 815–823.

Moeller, F., et al., "Differential Phase Shift Keying Direct Sequence Spread Spectrum Single SAW Based Correlator Receiver", in: *Ultrasonics Symposium, 1994, pp. 189–193*.

Schelbert, Peter G., "SAW–Correlator Module For Spread–Spectrum DPSK Asynchronous Demodulation", in: *Ultrasonics Symposium*, 1990, pp. 145–149.

Ikeda, T., et al. "Surface Acoustic Wave Binary Phase Shift Keying System for Time Division Multiple Access", in: *Jpn. J. Appl. Phys.*, 1993, pp. 2325–2328.

SPREAD SPECTRUM SIGNAL TRANSMISSION METHOD AND SYSTEM AND ALSO TRANSMITTER AND RECEIVER FOR USE WITH THE METHOD AND SYSTEM

FIELD OF THE INVENTION

The present invention relates to a spread spectrum signal transmission method, to a spread spectrum signal transmission system and also to transmitters and receivers for use with the method and/or the system.

The invention is particularly concerned with the wireless transmission of analog and digital signals.

DESCRIPTION OF PRIOR ART

In the past decades wireless communication systems have been increasingly used, which has led, on the one hand, to an increase in the electromagnetic burden of the environment, and, on the other hand, has made it necessary to find technical solutions to avoid interference, and in particular to avoid mutual interference through the different users.

The contribution of customary communication systems to the electromagnetic exposition has led to restrictions of the fields of use and to acceptance problems in the population.

A large number of technical systems are known in the prior art.

In recent times the commercial mobile telephone communication has increased substantially.

The prior art involves mobile radio telephones with transmitter powers in the range of 1 W (DCS 1800 (E1)), 2 to 20 W (GSM (D1/D2)) and 450 mW (DECT). With these powers cell sizes are covered which lie in the range of up to 35 km with GSM and up to 8 km with DCS 1800. These high transmitter powers can also interfere with sensitive apparatus, for example heart pacemakers and can possibly also cause health damage. The present route to reducing the transmitted power is the drastic reduction of the cell size, which makes the total cost and complexity for the system grow dramatically. A further possibility of reducing the transmitted power without, however, reducing the cell size, is offered by spread spectrum transmission techniques, which will subsequently be termed SS transmission techniques in short.

The development of SS transmission techniques is closely connected with progress in the field of acoustic surface wave technology (AOW), which has advanced greatly since the 1970s. Despite the many different SS systems, this modulation method has been restricted for reasons of technical cost and complexity to special applications.

In principal the reduction of the transmitted power is achieved by an increase in the bandwidth of the transmission. A general portrayal of SS transmission techniques on the basis of AOW components is given in documents [1] and [2] of the attached list of documents.

In the following the state of the art of SS transmission techniques will be explained in more detail with the emphasis on high-frequency (HF) electronics, AOW techniques and signal processing. The numbers set in square brackets likewise relate to the documents which are to be found with the same numbers in the list of documents.

(i) RF Electronics

A comparatively high carrier frequency is necessary in order to be able to realize the required bandwidth for SS systems. The ISM (industrial, scientific and medical) frequency band of 2.4 to 2.483 GHz is, for example, suitable for SS communication techniques. As a result of the low noise and of the high efficiency—even at low operating voltage—components based on GaAs are used in preference to Si components. The prior art involves integrated power end stages based on GaAs for the transmitter and receiver component assemblies of handys.

(ii) AOW Technique

The prior art involves convolvers and correlators which utilize AOW on piezoelectric and semiconducting substrates. Convolvers have the advantage of free choice of the code that is used, have, however, the disadvantage of complicated synchronization. As an alternative, AOW correlators offer a simple synchronization with it, however, being more complicated to change the code. Programmable AOW correlators are also described in the literature. However, they do not appear to have found any use beyond military techniques. These components are preferably realized on quartz or $LiNbO_3$ with external electronics [3], [4] or on Si substrates with a piezoelectric ZnO layer [5] for the integration of the electronics with AOW technique. The first variant is complicated as a result of the hybrid technology; the second variant is more difficult to control, in particular for high frequencies. References to the integration of acoustic and electronic components on the piezoelectric semiconductor substrate GaAs for the manufacture of a programmable correlator are given by [6] and [7]. Nothing is known concerning the use of these components.

(iii) signal Processing: Modulation and Coding

Many signal processing and modulation principles for SS systems are known in the prior art. A detailed summary is given in [8]. Accordingly, there is a series of solutions for the SS transmission of digitalized data. The most important distinguishing features lie in the type and manner of the signal processing, especially in the modulation and coding and the hardware associated therewith. In the following some methods are described which appear interesting as technological background.

A modem for the transmission of binary data with very low HF output power is described in [9] and [10] and is protected by the patents DE 39 01 639 C2 [11] and U.S. Pat. No. 4,926,440 [12]. The modem contains an asynchronous SS system exploiting an AOW convolver.

In the transmitter an FSK (frequency shift keying) modulation of the binary data stream by a voltage controlled oscillator (VCO) takes place. The FSK signal with the frequencies $f''_1$ and $f''_2$ is subsequently modulated by mixing with a code using the DS (direct sequence) modulation method. The width of a bit (base information length $T_B$) must be very much greater (factor $T_B > 10T \ldots 100T$) than the length (period) of a code sequence (2T) [11, column 5, FIG. 50]. The result of the modulation is a phase coded signal with a binary keyed center frequency (carrier frequency) $f''_1$ and $f''_2$. This signal is frequency converted, filtered, amplified and transmitted (now $F'''_1$ and $F'''_2$).

In the receiver the SS signal is frequency converted, filtered (now designated with $f_1$ and $f_2$ with the carrier frequencies $f''_1$ and $f''_2$) and folded in the convolver with a reference code (time inverse signal from the transmitter) with the frequencies $f_1$ and $f_2$ (carrier frequencies $f''_1$ and $f''_2$).

In the first embodiment the two frequencies are so selected that the SS signal with the carrier frequency $f''_1$ forms correlation peaks with the period $f_1$ after folding (with the reference code of the carrier frequency $f_1''$), the signal is, however, not correlated with the second carrier frequency [11, column 10, section 40]. The bit is reconstructed in TTL level from several peaks.

A further embodiment of the invention described in [11] consists of a transmitter and a receiver of the same type of construction with a double convolver system [11, column 10, section 65]. In this variant one convolver (carrier frequency is constant) detects the SS signal with the carrier frequency $f_1''$ and the other the SS signal with the carrier frequency $f_2''$ [11, column 10, section 45]. The series of folding signals with the periods $f_1$ and $f_2$ are converted by a comparison modulator into a binary output signal.

The data rate is quoted as 1200 to 9600 Bit/s. The range amounted to 110 m with a field strength of 500 $\mu$V/m (or 10 km at 1 W) [10]. The transmission of data between computers is named as an application. The expansion of the modulation principle to duplex transmission is described in [13].

Through the named methods which relate to changing the carrier frequency of the SS signal it is only possible to transmit binary coded signals. Analog signal transmission is only possible with this method after prior conversion into a binary data stream.

In the system described multiple sampling of the binary stream (10 . . . 100 times) is necessary to ensure reliable detection. The data rate is thereby greatly reduced. The cost and complexity of the hardware is not inconsiderable.

An SS radio system for wireless transmission is presented in [14]. The proposal made there contains a DPSK (differential phase shift keying) SS system. The band-spreading takes place by mixing the differentially coded binary data with a code (127 chip). A BPSK (binary phase shift keying) modulator is used for this purpose. The code is externally generated. The receiver utilizes a DPSK demodulation. The communication between office buildings is mentioned as an application. Experiments took place with an RF output power in the range from a few hundred nW with transmission distances up to 30 m.

Integrated modules with DPSK modulation methods which contain two combined matched filters (PSK filters) are described in [15] and [16]. The bit rates are 300 kBit/s (63 chip code) [15] and 250 kBit/s (103 chip code) [16].

A transmission of analog signals is also not possible with this system.

A BPSK (binary PSK) communication system for TDMA operation (time division multiple access) is described in [17]. The PSK signal (8 chip code) is generated with negative or positive pulses using a special AOW arrangement with two excitation converters and an output converter. The synchronized demodulation of the signal takes place with a component with the same layout. The audio signal transmission after A/D conversion (analog/digital conversion) is named as an application. The data rate lies, depending on the channel capacity, at 50 Bit/s (30,000 channels) to 700 kBit/s (1 channel).

Analog signals can likewise not be transmitted directly but only after prior A/D conversion.

The transmission of a measurement signal in a telemetry application with SS techniques is described in [18]. Here it is assumed that the measurement signal is present as a frequency analog output signal. It is converted by mixing with a reference signal to a low frequency (NF) output signal. An SS code is generated and transmitted per period of this NF signal. In the receiver this signal is correlated so that the repetition frequency of the pulses represents a measure for the measurement value.

OBJECTS OF THE INVENTION

The object of the present invention is to enable the wireless transmission of both analog and also digital signals using SS techniques, with a transmission over a large range being possible even with low transmitter power. In other words, a transmission over relatively large ranges is to be achieved with transmitter powers which are low in comparison to customary communication systems.

With the transmission method or transmission system of the invention it should, amongst other things, be possible to achieve a reliable signal transmission, for example speech transmission, with very low spectral power densities of the electromagnetic radiation, which is in particular suitable for use in sensitive areas, for example in hospitals, in passenger vehicles, or in plants where the danger of explosion exists, or in environments with high electromagnetic interference, for example electricity generating plants, transmitter stations or with permanent occupational exposure (radio messages). Moreover, a signal transmission over large ranges should be achieved with the same transmitted power in comparison to conventional systems, and also a signal transmission with low transmitted powers should be achieved for the same range in comparison to conventional systems. Moreover, the transmission of sound and images at high quality, i.e. with a large bandwidth, should be achieved.

In particular a method and a system should also be provided by means of the present invention which enables a reliable delimitation of authorized user circles relative to non-entitled users, for example for radio and TV transmissions which can only be received against payment. A secure and reliable signal transmission should also be possible, for example in the field of personal communications and signal transmission in a system for very many participants.

Fields of application exist everywhere where a reliable transmission of signals secure against interference, for example speech, is to take place without wires with very low transmitted powers over distances in mobile radio cell units of ca. 10 km.

BRIEF DESCRIPTION OF THE INVENTION

In order to satisfy these objects method-wise a spread spectrum signal transmission method is provided in which a carrier frequency is modulated, in particular frequency modulated, in a transmitter with an analog or digital baseband signal, and the frequency modulated carrier is converted into a pulse sequence, the pulses of which are used to trigger coded band-spread signals which are transmitted via an antenna and in which the transmitted signals are subsequently received by an antenna and are decoded with a code which is the time inverse of the code of the coded band-spread signals, whereby a sequence of correlation peaks arises, which is converted into a pulse sequence, and is subsequently demodulated, in particular frequency demodulated, to obtain an output signal corresponding to the analog or digital baseband signal.

The method is in particular carried out in such a way that the conversion of the frequency modulated signal into a pulse sequence takes place by means of a zero point detector or a threshold circuit and the pulse sequence is supplied to a circuit in which a sequence of coded signals is triggered by the pulse sequence and in such a way that the linking of the received signal with the time inverse code is carried out by means of a correlator, the output signal of which is a sequence of correlation peaks which are converted, by means of a demodulator with a threshold switch at the receiver side, into the pulse sequence whose repetition frequency corresponds to the repetition frequency of the pulse sequence at the transmitter side.

Apparatus-wise a spread spectrum signal transmission system is proposed in accordance with the invention, comprising a transmitter with an oscillator for generating a carrier frequency, a modulation device for the modulation of the carrier frequency, in particular for the frequency modulation of the carrier frequency, with an analog or digital baseband signal, a coding device or a coding module in which the modulated carrier frequency is convertible into a pulse sequence, the pulses of which are then linked with a code, optionally after prior frequency conversion, in the sense of triggering coded band-spread signals, and an antenna circuit for the transmission of the signals obtained from the coding device, optionally after prior frequency conversion, and also a receiver circuit having an antenna which supplies the received signals, optionally after frequency conversion, to a decoding circuit in which the signal is linkable with a code being the time inverse code of the first named code, whereby a sequence of correlation peaks arises, a circuit for converting the sequence of correlation peaks into a sinusoidal signal and a demodulator which demodulates the sinuseudal signal, optionally after prior frequency conversion, into an output signal which corresponds to the analog or digital baseband signal.

The method or the apparatus is distinguished from other known methods or apparatuses, amongst other things, in that a sequence of identical codes of constant center frequency is transmitted from the transmitter and contains the frequency modulated baseband signal in the form of the time dependency of this sequence, with this frequency modulated baseband signal being recovered again after correlation reception. A substantial advantage lies in the fact that a transmission of frequency modulated signals can be effected without analog/digital conversion (A/D conversion) which, as a rule, has the consequence of a restriction of the transmission rate. A further advantage is that the transmission of digital signals with a comparatively high data rate is possible while retaining the important components of the system. Through the omission of the necessity of a signal synchronization at the receiver side the system is simple and cost favorable. Extensive integration is possible through the low number of system components and the ability to realize them (e.g of the AOW components) in planar technology.

Expressed briefly, the invention includes an SS communication arrangement comprising of a transmitter in which a carrier frequency is modulated with an analog or digital baseband signal, the modulated carrier frequency is converted into a pulse sequence and the pulse sequence is linked in a suitable manner with a code and comprising a receiver in which the baseband information is recovered by correlation reception and demodulation, with it being possible to transmit both analog and also digital signals.

Characteristic for the invention is the fact that the center frequency of the code does not have to be changed and that the repetition frequency of the code serves as the information carrier.

The reliable transmission of analog signals with a high dynamic range requires a broad band analog phase or frequency modulation (FM) of the carrier frequency, with the base-band signal as the primary modulation. In the transmitter the secondary modulation takes place in such a way that nonequidistant reference points are generated from the primary modulated signal (FM) which determine the time points of transmission of the code. The correlation reception of the code sequence takes place in the receiver. The baseband information is recovered from the repetition frequency of the correlation peaks, as will be explained further below with reference to a specific embodiment.

BRIEF LISTING OF THE FIGURES

FIG. 1A is a schematic illustrating a transmitter of a spread spectrum transmission system in accordance with the invention, FIG. 1B is a schematic illustrating a receiver of a spread spectrum transmission system in accordance with the invention which is in particular intended for use with a transmitter in accordance with FIG. 1A.

FIG. 2A contains different diagrams to explain a coding procedure in the transmitter of FIG. 1A with reference to the generation of the signal to be transmitted, and FIG. 2B contains various diagrams to explain the signal processing in the decoding circuit and in the demodulator circuit of the receiver of FIG. 1B for the recovery of the baseband signal.

DESCRIPTION OF THE PREFERRED EMBODIMENT

Figure 1A:
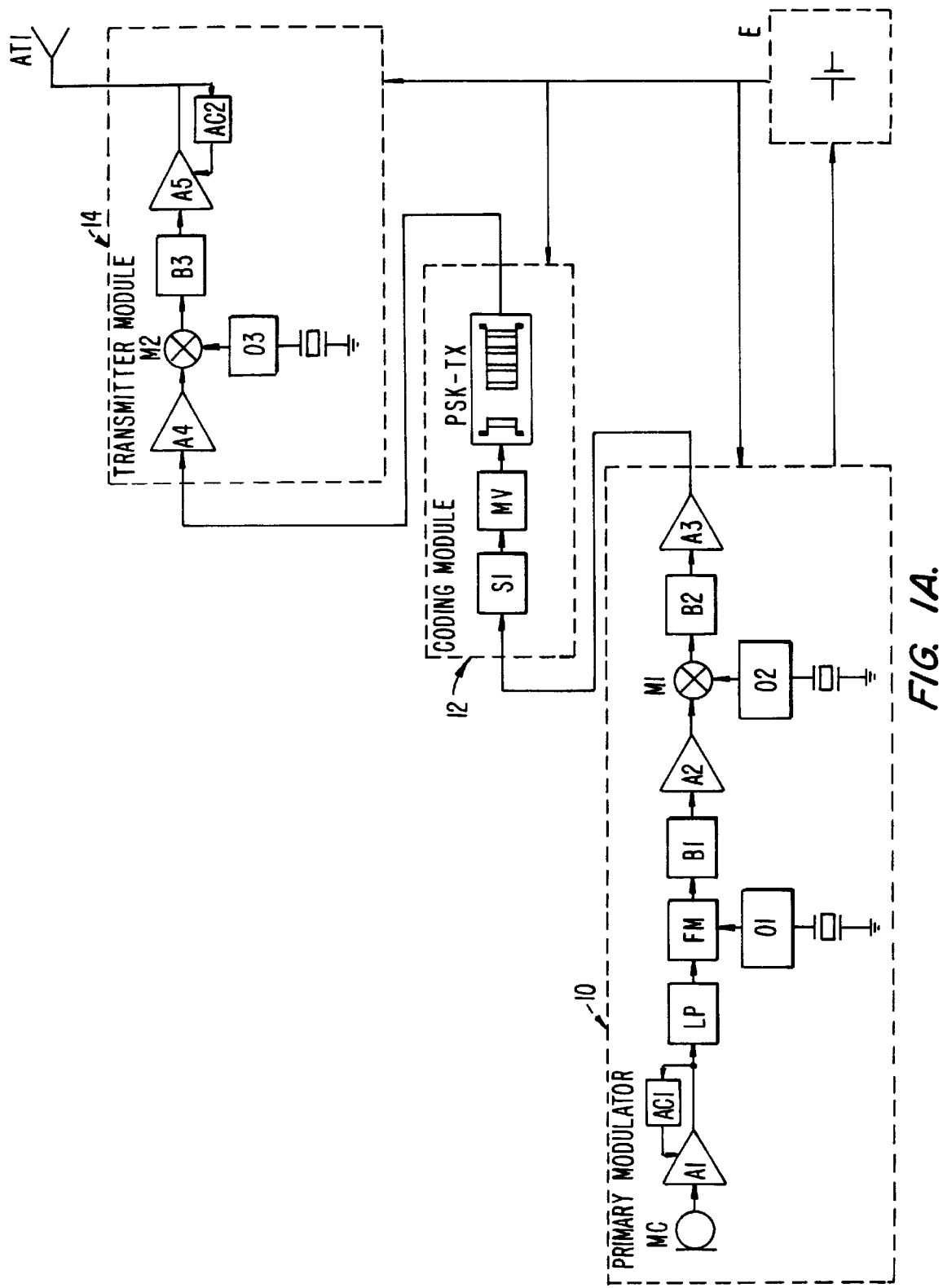
Figure 1B:
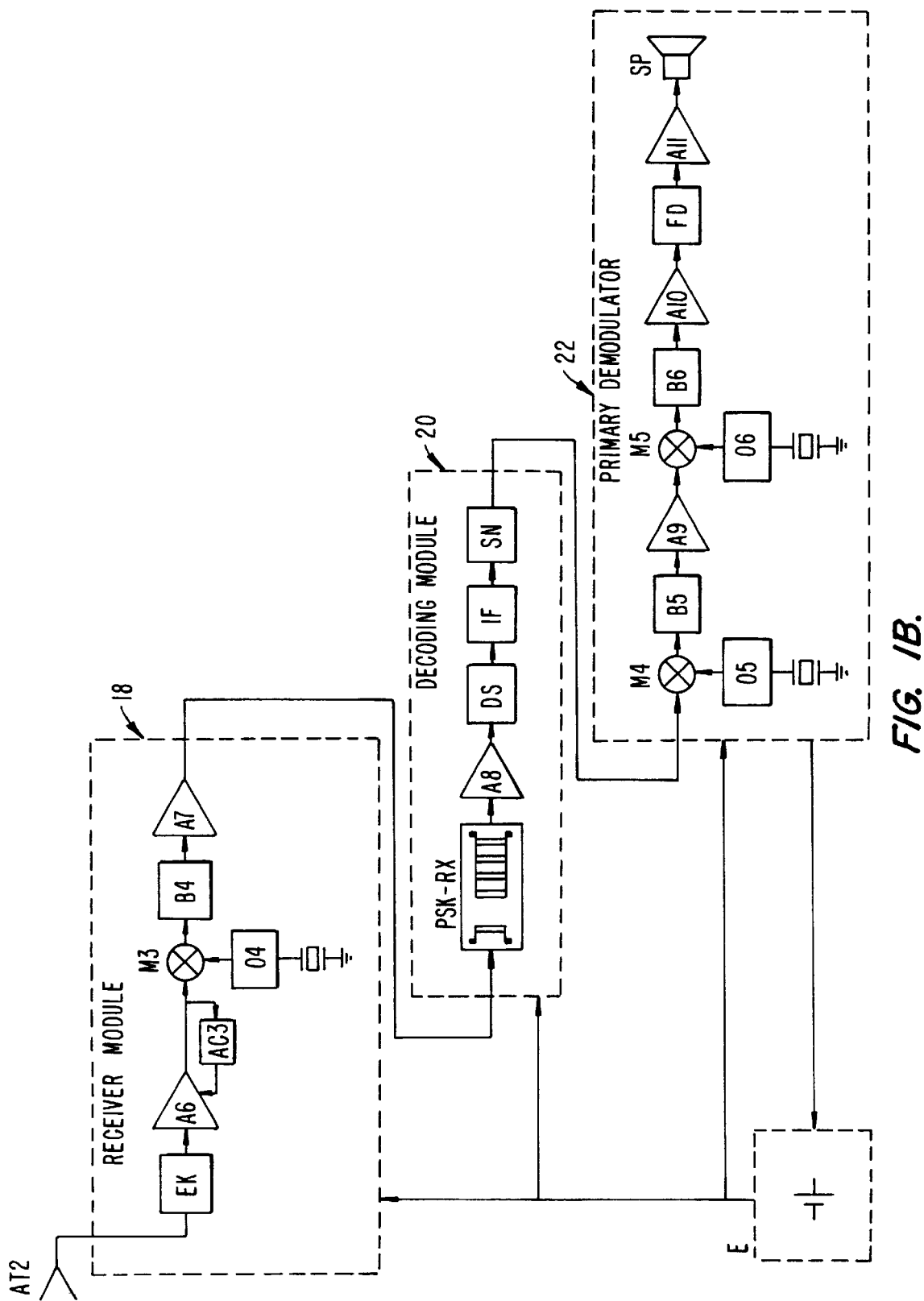

FIG. 1 shows an embodiment of the SS communication system of the present invention. FIG. 1A contains the transmitter, FIG. 1B the receiver. The transmitter consists of the primary modulator 10, the coding module 12 and the transmitter module 14. The primary modulator contains a frequency modulator FM which converts a baseband signal into a frequency analog signal. For the explanation it is assumed in the following by way of example that the baseband signal is an audio signal. This signal is recorded by microphone MC, is amplified by an amplifier A1 with an automatic gain regulation circuit AC1 and is filtered by means of a low-pass filter LP. An oscillator O1 delivers the carrier frequency for the frequency modulation, which is realized by the frequency modulator FM. After passing a band-pass filter B1 and an amplifier A2 the signal is converted into the order of magnitude of the desired repetition frequency. The component groups for this function are a mixer M1, an oscillator O2 and the filter B2 and amplifier unit A3. Depending on the size of the repetition frequency the conversion by the mixing with the oscillator O2 can be omitted or can be supplemented with a mixing procedure with a further oscillator stage.

The output signal of the primary modulator is fed into the coding module 12. Here it is converted with the aid of a zero point detector or a threshold switch S1, in each case with a subsequent monostable multivibrator MV into pulses. The pulse sequence which arises is supplied to the PSK transmitter filter PSK-TX. The output signal of the coding module is supplied to the transmitter module. After amplification by the amplifier A4 the signal is supplied, optionally after frequency conversion, with the aid of an oscillator O3 and mixer M2 with a subsequent band-pass filter B3 and an amplifier A5 with automatic gain control AC2 to the transmitter antenna AT1. The voltage supply of all modules can take place by a common supply unit E.

Figure 2A:
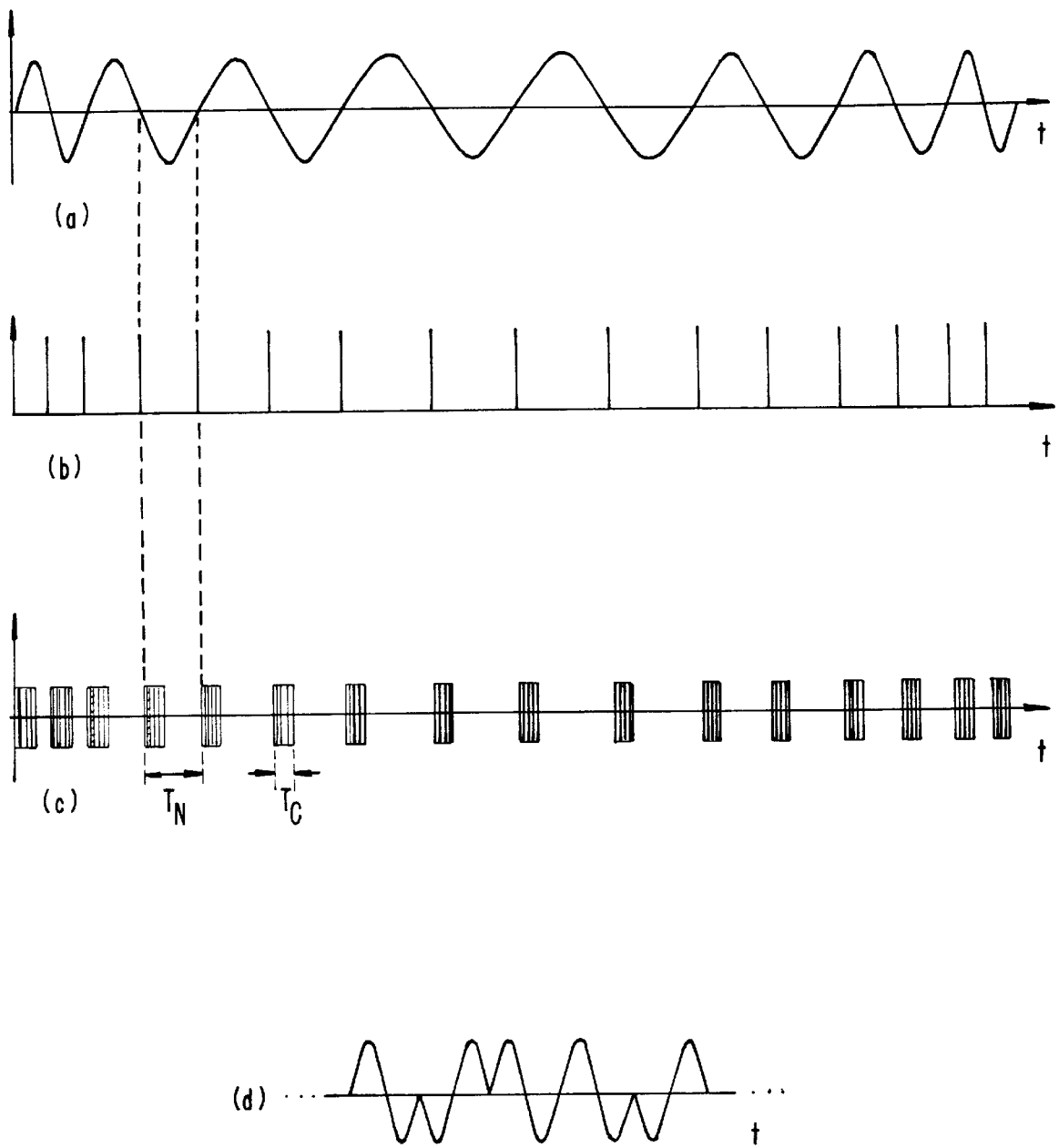

In order to make the task of the coding module clear the signal conversion which takes place therein will be described in more detail with reference to FIG. 2A The signal track (a) shows the time course of a signal by way of example over a certain time range. This signal is converted into a pulse sequence in such a way that each n-th (n=1, 2, . . . ) zero passage or the passage through a threshold value triggers a pulse. For n=1 the pulse sequence is shown in the signal track (b). Each pulse generates a code at the output of the PSK transmitter filter (PSK-TX), which is determined by the structure of the filter (signal track (c)). $T_N$ designates the time spacing between two neighbouring pulses and $T_C$, the time length of the PSK code. The typical structure of a PSK code with the characteristic phase keying is sketched in the partial FIG. (d). I.e., for each pulse of FIG. 2A(c), a signal plot is generated in accordance with FIG. 2A(D), with the spacing between the respective signal plots corresponding to the spacing between the respective pulses of FIG. 2A(c).

The receiver of the invention illustrated in FIG. 1B consists of a receiver module 18, a decoding module 20 and a primary demodulator 22. The SS signal is received by an antenna AT2. Frequencies lying outside of the SS range are filtered out by an input circuit EK. After the amplification by the amplifier A6 with automatic gain control AC3 the SS signal is converted by means of a mixer M3 and an oscillator O4 to the frequency of the PSK filter of the decoding circuit or of the decoding module 20. The signal is passed, after filtration by the filter B4 and amplification with the amplifier A7 to the input of the decoding module. Here the signal is fed into the input of the receiver PSK filter (PSK-RX). The filter PSK-RX contains the time inverse code of the transmitter filter. Each signal which arrives which is provided with the transmitter code generates a correlation peak at the output of the filter. After amplification with the amplifier A8 pulses are generated from the correlation peaks by means of a demodulator with a threshold switch DS. A rectangular signal with TTL level is subsequently generated from the pulses by means of the pulse shaping device IF. The rectangular signal is converted with the device SN into a sinusoidal signal for the recovery of the analog signals. This sinusoidal signal is now coupled into the primary demodulator. After the frequency conversion, here represented as two stage conversion with the component groups mixer M4, M5, oscillator O5, O6, band-pass filter B5, B6 and amplifier A9, A10, the signal is demodulated with the frequency demodulator FD, is amplified by the amplifier A11 and is fed to a loudspeaker SP.

Figure 2B:
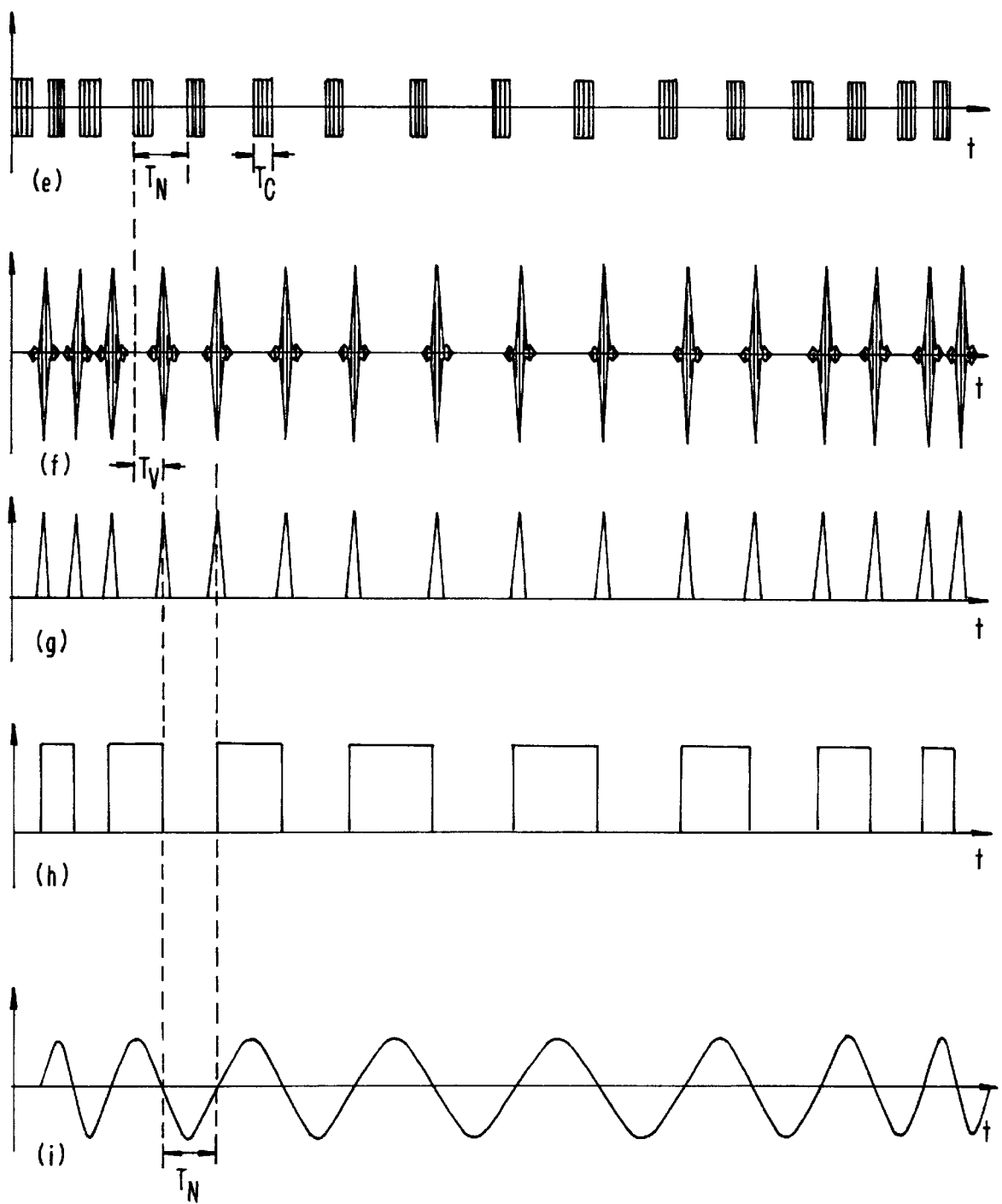

The task of the decoding module will be described with reference to FIG. 2B. Signal track (e) shows the time sequence of the received coded signals which corresponds to the transmitted code sequence. In track (f) correlation peaks provided with the delay $T_V$ are shown. In track (g) there are shown the pulses that are obtained from it. Each m-th (m=1, 2, . . . ) pulse is utilized to generate a rectangular signal (which is shown by way of example in track (h) for m=1). A frequency modulated signal is generated from the rectangular signal (track (i)).

As previously described a rectangular signal is generated in the receiver from the correlation peaks by means of a threshold switch S2 contained in DS and a pulse shaping device IF. In a further embodiment the pulse shaping device IF contains a monostable multivibrator which generates a pulse for each correlation peak. The pulses have a constant or variable time length. After the expiration of the holding time the level drops back to the initial value. The frequency of the sequence is the same as the frequency of the correlation peaks. The FM demodulation takes place by integration of the rectangular signal over time (principle of the count frequency demodulator).

The frequency conversion which is discussed several times in the description (by mixing with the oscillator frequencies of the oscillators O2 to O6) is not in principle necessary. It merely serves to be able to carry out specific signal processing steps in the frequency ranges provided.

It will not be difficult for the person skilled in the art to realize or to combine the primary modulation and demodulation with other known methods, for example quadrature modulation, in order to make available the signals required for the correlation module or to convert the signals obtained from the decoding module into a useful signal.

We claim:

1. A spread-spectrum signal transmission method comprising:

frequency modulating a carrier frequency in a transmitter with an analog or digital baseband signal to form a frequency modulated signal;

converting the frequency modulated signal into a first pulse sequence;

trigging a first code with pulses of the first pulse sequence to thereby provide coded band-spread signals;

transmitting the coded band-spread signals via an antenna;

receiving the transmitted signals by an antenna;

decoding the received transmitted signals with a second code that is a time inverse of the first code, whereby a sequence of correlation peaks arises that is converted into a second pulse sequence; and frequency demodulating the second pulse sequence to obtain an output signal corresponding to the analog or digital baseband signal;

wherein the conversion of the frequency modulated signal into the first pulse sequence takes place by means of a zero point detector or a threshold switch, and the first pulse sequence is supplied to a circuit in which a sequence of said coded band-spread signals is triggered by said first pulse sequence: and wherein the decoding of the received signal with the second code is carried out by means of a correlator, an output signal of which is a sequence of correlation peaks that are converted by means of a demodulator with a threshold switch at the receiver side into said second pulse sequence, said second pulse sequence having a repetition frequency corresponding to a repetition frequency of said first pulse sequence at the transmitter side.

2. A method in accordance with claim 1, wherein a PSK transmitter filter is used to generate said coded band-spread signals in said transmitter and a PSK receiver filter containing said second code is used in said receiver to produce said sequence of correlation peaks.

3. A method in accordance with claim 1, wherein said frequency modulated signal of said transmitter is converted to a desired repetition frequency before it is used to trigger said coded-band-spread signals.

4. A method in accordance with claim 1, wherein said second pulse sequence derived from said sequence of correlation peaks comprises a reconstructed frequency modulated carrier signal, that is subjected to frequency conversion prior to demodulation.

5. A method in accordance with claim 1, wherein said coded band-spread signals in said transmitter are subjected to a frequency conversion before being applied to said antenna of said transmitter, and wherein a frequency conversion is effected at the receiver prior to the decoding with said second code.

6. A method in accordance with claim 5, wherein said sequence of correlation peaks in the receiver is reshaped after conversion by means of a demodulator with a threshold switch and subsequently by means of a pulse shaping device into a rectangular signal with transistor/transistor logic level, and is subsequently converted into a sinusoidal signal.

7. A method in accordance with claim 6, wherein said sinusoidal signal is demodulated to a receiver output signal either directly or after a frequency conversion.

8. A spread-spectrum signal transmission system comprising:

a transmitter comprising:

an oscillator for generating a carrier frequency;

a modulating device for the frequency modulating of the carrier frequency with an analog or digital baseband signal to form a frequency modulated signal;

means for converting said frequency modulated signal into a pulse sequence;

coding means for linking pulses of said pulse sequence with a first code to trigger a sequence of coded band-spread signal obtained from said coding means; and a receiver comprising:

an antenna that supplies received signals to a decoding circuit for linking said received signals with a second code that is a time inverse of the first code of said coding means, whereby a sequence of correlation peaks arises;

a circuit for converting said sequence of correlation peaks into a sinusoidal signal; and a demodulator for demodulating said sinusoidal signal into an output signal corresponding to said analog or digital baseband signal;

wherein said means for converting said frequency modulated signal into the pulse sequence includes a zero point detector or a threshold switch and said coding means for linking pulses of said pulse sequence with the first code comprises a PSK transmission filter, and wherein said decoding circuit of said receiver has a PSK receiving filter containing the time inverse code of the first code of said coding means, wherein said sequence of correlation peaks are obtained at an output of said PSK receiving filter, and said decoding circuit includes a demodulator having a threshold switch and a pulse shaping device, and wherein said decoding circuit further includes a signal shaping device having an output at which a modulated signal is available.

9. A spread-spectrum signal transmission system in accordance with claim 8, wherein said transmitter has a frequency converter for converting said frequency modulated signal to a desired repetition frequency prior to passing it to said coding means.

10. A spread-spectrum signal transmission system in accordance with claim 9, wherein a band pass filter and an amplifier are provided in the transmitter between said modulation device and said frequency converter.

11. A spread-spectrum signal transmission system in accordance with claim 8, wherein said receiver has a frequency converter between said antenna and said decoding circuit.

12. A spread-spectrum signal transmission system in accordance with claim 8, wherein said transmitter has a frequency converter provided between said coding means and said antenna circuit.

13. A spread-spectrum signal transmission system in accordance with claim 8, wherein said receiver has a pulse shaping device that reshapes said sequence of correlation peaks after the conversion by means of a demodulator with a threshold switch into a rectangular signal with transistor/ transistor logic level and wherein a pulse shaping device is provided to convert said rectangular signal into a sinusoidal signal.

14. A spread-spectrum signal transmission system in accordance with claim 13, wherein said transmitter contains an amplifier to amplify said baseband signal and a filter to filter the amplified baseband signal.

15. A spread-spectrum signal transmission system in accordance with claim 13, wherein said pulse shaping device of said receiver contains a monostable multivibrator that generates a pulse for each correlation peak and falls back to an output value after expiration of a holding time, and wherein said holding time is shorter than the time spacing between two sequential pulses at a highest provided repetition frequency.

16. A spread-spectrum signal transmission system in accordance with claim 15, wherein said rectangular signal is passed to an integrator to effect frequency demodulation by integration of the rectangular signal over time.

17. A spaced-spectrum signal transmission system comprising:

a transmitter comprising:

an oscillator for generating a carrier frequency;

a modulation device for the frequency modulation of the carrier frequency with an analog or digital baseband signal to form a frequency modulated signal; and means for converting said frequency modulated signal into a pulse sequence and coding means for linking pulses of said pulse sequence with a first code to trigger a sequence of coded band-spread signals obtained from said coding means; and a receiver comprising:

an antenna that supplies received signals to a decoding circuit for linking said received signals with a second code that is a time inverse code of the first code of said coding means, whereby a sequence of correlation peaks arises;

a circuit for converting said sequence of correlation peaks into a sinusoidal signal; and a demodulator for demodulating said sinusoidal signal into an output signal corresponding to said analog or digital baseband signal;

wherein said pulse shaping device of said receiver contains a monostable multivibrator that generates a pulse for each correlation peak and falls back to an output value after expiration of a holding time, with said holding time being shorter than the time spacing between two sequential pulses at a highest provided repetition frequency.

18. A spread-spectrum signal transmission system in accordance with claim 17, wherein side rectangular signal is passed to an integrator to effect frequency demodulation by integration of the rectangular signal over time.

19. A spread-spectrum signal transmission system comprising:

a transmitter comprising:

an oscillator for generating a carrier frequency;

a modulation device for a frequency modulation of the carrier frequency with an analog or digital baseband signal to form a frequency modulated signal;

means for converting said frequency modulated signal into a simplified pulse sequence representing a repeating feature of said frequency-modulated signal: and coding means for linking pulses of said simplified pulse sequence with a first code to trigger the transmission of a sequence of predetermined, substantially identical, coded band-spread signals obtained from said coding means;

a receiver comprising:

an antenna that supplies received signals to a decoding circuit for linking said received signals with a second code being a time inverse code of the first code of said coding means, whereby a sequence of correlation peaks arises, corresponding to said simplified pulse sequence;

a circuit for converting said sequence of correlation peaks into a sinusoidal signal; and a demodulator for demodulating said sinusoidal signal into an output signal corresponding to said analog or digital baseband signal.

\* \* \* \* \*